United States Patent Office 3,058,734
Patented Oct. 16, 1962

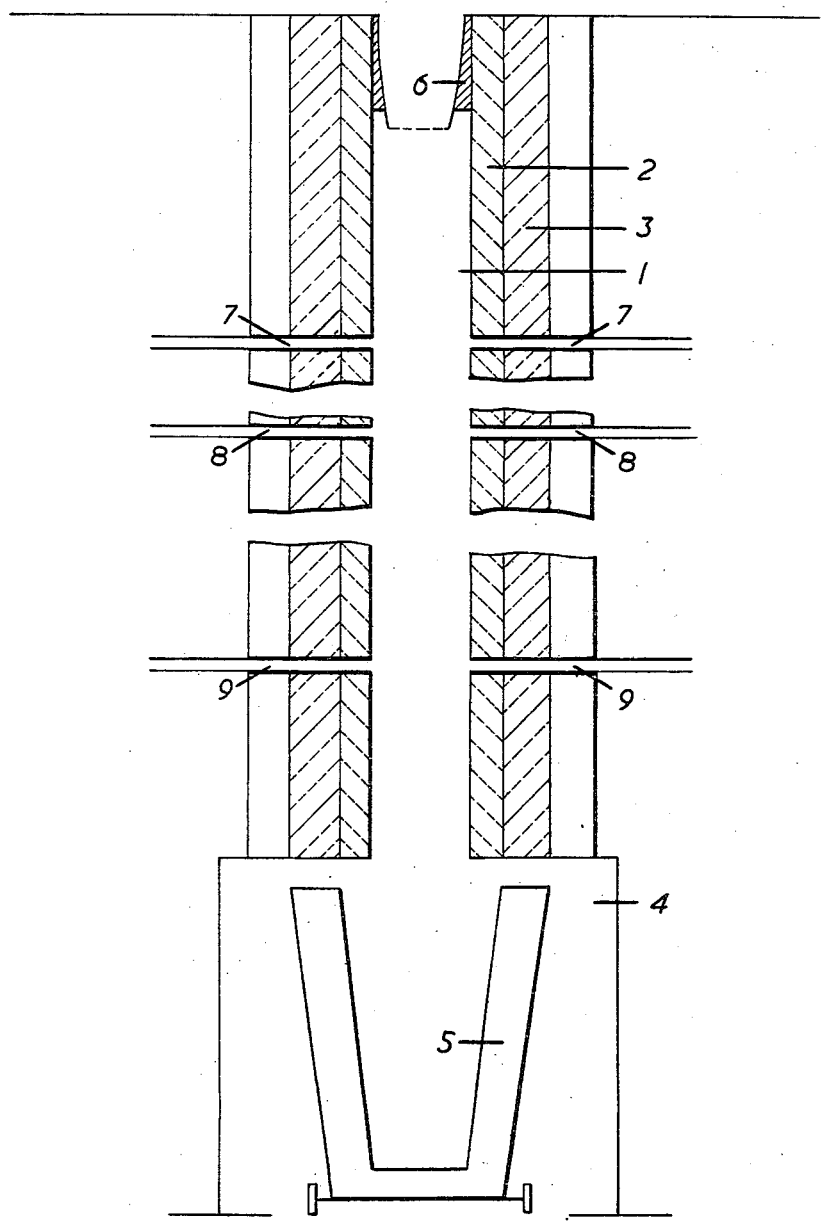

3,058,734
TREATMENT OF MOLTEN FERROUS MATERIAL
Thomas Christopher Churcher, Sutton, England, assignor to The British Oxygen Company Limited, a British company
Filed Sept. 24, 1958, Ser. No. 762,972
Claims priority, application Great Britain Oct. 21, 1957
2 Claims. (Cl. 266—34)

The present invention relates to the treatment of molten ferrous material for example for the removal of impurities such as carbon, silicon, manganese, phosphorus and sulphur. A process in accordance with the present invention may be used, for instance, for the treatment of molten iron or blast furnace metal for the reduction of such impurities either as pretreatment to be followed by subsequent operations or to produce metal of a desired composition. The process of the present invention can also be applied, however, to other treatment of ferrous material such as decarburising. These processes may be used for the production of metal which, in the state in which it will be used, contains substantial amounts of carbon and are also applicable to processes for the production of steels which may, if desired, have relatively low carbon content.

According to the present invention, a process for the treatment of molten ferrous material comprises pouring the molten metal and allowing it to fall through a reaction space in contact with a stream of an oxidising gas as herein defined flowing in the same direction, whereby during the passage of metal through the space a chemical reaction occurs between the metal and the oxidising gas.

The oxidising gas used in accordance with the present invention consists of oxygen or oxygen containing gases or vapours in which, if desired, solid oxidising materials can be suspended. For example, the gas may consist of air, oxygen enriched air, oxygen, carbon dioxide or oxygen diluted with an inert gas. These gases may be used singlely or in any appropriate combination and can, if desired, be admixed with water vapour or steam which can, if desired, be superheated. If desired, gaseous oxidising agents may be preheated. Examples of solid oxidising agents which can be suspended in the gaseous oxidising agents are millscale, iron ore, iron oxide and solid products extracted from the fume of ferrous metal refining processes, e.g. converter dust and solids extracted from the fume of a metal refining process in accordance with the present invention. If solids extracted from the fume of a process in accordance with this invention are used, they can either be collected in batches or can be collected progressively and fed back into the space through which the molten metal is poured. The return of the solids collected from the fume can be effected by returning to the reaction space the fume discharged from the reaction space.

The molten ferrous metal can also be brought into contact either during its passage through the reaction space or in a collector, such as a ladle, with slag forming materials, such as lime, limestone, soda ash, fluorspar or bauxite. These slag forming and/or fluxing materials can also be admixed with the solid oxidising agents as above mentioned and they can themselves, in some cases, act at least partially as solid oxidising agents, for instance, limestone when in contact with the molten metal may evolve carbon dioxide.

In one arrangement in accordance with the present invention, molten ferrous material is poured into the top of a tower lined with refractory material and before reaching a ladle or other receptacle stationed below the tower, passes through a reaction space down which a gaseous oxidising agent, as above defined is passed. For example, oxygen or oxygen enriched air or a mixture of oxygen and steam or oxygen and carbon dioxide or oxygen and carbon dioxide and steam may be passed downwardly through the reaction space. The gaseous oxidising agent is preferably fed continuously to the reaction space during the carrying out of the treatment. For example, the gas or part of the gas may be fed to the upper end of the reaction space, through one or more tuyeres. If desired, where a mixture of gases is used, the mixing may be effected within the reaction space as an alternative to mixing outside the reaction space. In order to prevent the upward escape of gas and fumes, the top of the tower must be rendered substantially gas tight.

In order to minimise wear on the refractory lining of the tower and to assist in breaking up the falling metal, it is preferred to feed the gas to the upper part of the tower through one or more pairs of tuyeres, the tuyeres of each pair being located diametrically opposite one another. With this arrangement, the two jets of oxidising gas impinge against each other at the axis of the tower and the reacting materials are not directed against the refractory lining as would be the case if one tuyere only were used.

Preferably in an arrangement in accordance with this invention, the molten ferrous metal is allowed to fall under gravity through the reaction space in a plurality of fine streams or as droplets in co-current contact with a stream of the oxidising gas passing downwardly through the reaction space. The division of the flow of molten metal into the fine streams or droplets may be effected in any convenient manner. For instance, the molten metal may be fed at the top of the reaction space into a cup or crucible of refractory material having in its bottom one or more holes through which the metal can pass to form a fine stream. Alternatively, the molten metal may be arranged to flow over a weir system so shaped as to cause the molten metal to flow as one or more relatively thin streams which may break up into droplets as the molten metal falls through the reaction space under the influence of gravity. In accordance with further alternative arrangements, also in accordance with the present invention, the molten metal is arranged to fall on to one or more baffles of refractory material which cause the stream of metal fed to the reaction space to present a large surface area to the oxidising gas. In an arrangement and process in accordance with this invention it is preferred to arrange that the molten metal falls freely under gravity from the upper end of the tower through the reaction space without coming into contact with the walls of the reaction space, so that there is relatively little wear on the lining except possibly towards the bottom of the space where some metal may be splashed on the walls of the reaction space. For example, a jet of oxygen or other oxidising or inert gas may be used to deflect and partially atomise the metal entering the tower, or two or more streams of metal may be permitted to impinge against one another at the top of the tower so that the streams are deflected and broken up. The scope of the present invention is, however not limited to such arrangements and it is, therefore, to be understood that this invention is not limited to arrangements in which the molten metal falls through the reaction space without coming into contact with the walls thereof. As a further alternative, a mechanical method of deflecting and splitting the metal stream poured from a transport vessel into the top of the tower may be used, so that the metal enters the tower as droplets or fine streams. It will be appreciated that in every case, it will be necessary to arrange for the top of the tower to be substantially gas-tight. Thus where a crucible is used it is necessary to seal the gap between the crucible and the inner wall of the tower.

The apparatus for carrying out a process in accordance with the present invention may comprise a tower-like structure having a lining of refractory material and having a vertically extending shaft which constitutes the reaction space through which the metal passes. From the reaction space the molten metal falls directly into a receptacle stationed below the shaft. At the upper end of the shaft there is provided a device for receiving the molten metal and dividing it into one or preferably a plurality of fine streams before it falls through the tower. In order to prevent freezing of the metal it is necessary to ensure that the parts of the apparatus with which the molten metal comes into contact are at a sufficiently high temperature. For this purpose it may be necessary to provide one or more burners or other heating means for maintaining such parts of the apparatus at a temperature above the melting point of the ferrous material to be treated. If the arrangement is such that while passing through the reaction space the metal does not come into contact with the walls of the reaction space, it may be unnecessary to heat the walls of the reaction chamber except towards the bottom where some splashing from the collector may occur. If desired, however, provision may be made for heating the tower throughout its height or at spaced intervals over its height. Gas burners may be used for this purpose. In general, heating of the tower may conveniently be effected by the use of a single burner located at the bottom of the tower. In one form of construction of apparatus in accordance with the present invention, a tower has a vertical shaft surrounded by a lining of refractory material which in turn is surrounded by heat insulation supported by a metal exterior structure. The lower end of the shaft is open so that molten metal which has passed through the shaft is delivered directly to a crucible or ladle stationed below the shaft. At the upper end of the tower a crucible having a plurality of holes in its bottom, as above described, is mounted concentrically with the shaft, any gap between the outer wall of the crucible and the inner wall the shaft being sealed. Molten metal to be treated may be poured in any convenient manner into the refractory crucible at the top of the tower, for instance, from a ladle. At or near the top of the reaction chamber within the tower, there is provided one or more pairs of tuyeres through which the oxidising gas and, if desired, also solid oxidising and/or slagging and/or fluxing materials can be fed into the reaction space. The tuyeres in each pair are located diametrically opposite one another. If desired, one or more additional inlets for gas or vapour or solid materials may be provided at one or more points lower down the tower. Where a plurality of pairs of tuyeres is provided different oxidising gases or different mixtures of oxidising gases optionally with the addition of solid material can be fed into the reaction space through different pairs of the tuyeres.

The nature of the treatment which can be performed in the apparatus will depend upon the composition of the ferrous metal which is poured into the reaction space and also upon the nature of the oxidising gases and the solid oxidising, slagging, or fluxing materials which are brought into contact with the molten metal between the time when it enters the reaction space and the time at which it leaves the apparatus. It is, of course, possible to effect further treatment of the metal in the ladle or other receptacle to which the molten metal is fed from the bottom of the tower. The temperature at which the molten metal is poured can also have an influence on the nature and efficiency of the treatment.

One form of apparatus suitable for use in carrying out the process of the present invention is shown in the accompanying drawing, which shows a diagrammatic sectional side view of the apparatus. The apparatus comprise a tower some 9 feet in height having a vertical shaft 1 some 8 inches in diameter extending through it, the shaft being lined with refractory material 2 and surrounded by heat insulating material 3. The tower is mounted on a framework, indicated at 4, in such manner that a ladle 5 can be stationed beneath the lower end of the shaft 1 to receive metal falling through it.

At its upper end, the shaft 1 is closed by a crucible 6, any spaces between the outer surface of the crucible and the interior of the shaft 1 being sealed to present egress of gas. The bottom of the crucible is furnished with 20 holes, $\frac{3}{32}$ inch in diameter.

At the top of the tower a little below the bottom of the crucible a pair of tuyeres 7 is provided for the introduction of the oxidising gas. These tuyeres are located diametrically opposite one another and are connected at their outer ends to a common supply pipe. A similarly disposed pair of tuyeres 8 is located at a point midway up the tower, these tuyeres also being connected to the oxidising gas supply pipe. The tuyeres are of 1 inch bore.

The tower is arranged to be heated by gas flames through burner ports 9 located near to the bottom of the tower.

In operation, the tower is raised to a temperature of the order of 1000° C. by means of gas flames issuing from the burner ports 9.

Oxidising gas is then introduced into the shaft 1 through the pairs of tuyeres 7 and 8. If desired, the oxidising gas may contain powdered oxidising agents and/or slag-making substances in suspension therein. A charge of molten ferrous material is then poured into the crucible 6 and emerges through the holes in the bottom of the crucible in the form of a plurality of fine streams or droplets. The metal in subdivided form falls through the shaft 1 in contact with the stream of oxidising gas which is constrained to flow in the same direction since the top of the shaft 1 is sealed during pouring of the molten material. During its fall through the shaft 1, oxidisable impurities in the molten material are at least partially removed by reaction with the oxidizing gas. The purified material falls through the open lower end of the shaft 1 into the ladle 5. Excess oxidising gas and fumes leave the shaft 1 through the space between the bottom of the tower and the top of the ladle 5.

The jets of oxidising gas entering the shaft 1 through the pairs of opposed tuyeres 7 and 8 respectively, impinge against each other at the axis of the shaft, and not only prevent the stream of molten metal being driven against the refractory wall of the shaft as would happen if only one tuyere were used at each level, but also create a zone of turbulence at the axis of the shaft through which the molten material has to pass. This turbulence assists both in breaking up the streams of molten material and in oxidising the impurities therein.

The invention is illustrated by the following examples in both of which an apparatus as described above and shown in the accompanying drawing was used.

*Example 1*

99 lbs. of molten ferrous material containing carbon, silicon and manganese as impurities were poured into the crucible and allowed to fall through the tower. The temperature of the material at pouring was 1435° C. Oxygen was simultaneously blown in through the two pairs of tuyeres at a total flow rate of 523 cu. ft. per ton of metal treated. During passage of the metal through the tower, the carbon content was reduced from 3.30 to 3.14%, the silicon content from 1.14 to 0.17%, and the manganese content from 0.92 to 0.22%. The oxygen efficiency was 78% and the metal yield 93% plus spill.

*Example 2*

98 lbs. of molten ferrous material containing carbon, silicon, manganese and phosphorus as impurities were poured into the crucible and allowed to fall through the tower. The temperature of the metal at pouring was 1420° C. The oxygen was blown in as in Example 1 but the time of pour was increased to give an oxygen consumption of 828 cu. ft. per ton of metal treated. At the same time 4 lbs. of lime ground to 20 mesh and smaller was injected through one of the oxygen tuyeres. During passage of the metal through the tower, the carbon content was reduced from 3.49 to 2.48%, silicon from 0.62 to 0.01%, manganese from 1.01 to 0.03% and phosphorus from 1.20 to 0.46%. The oxygen efficiency was 76% calculated from carbon, silicon and manganese oxidation only.

I claim:

1. Apparatus for the treatment of molten ferrous material comprising a refractory lined tower having walls defining a vertically extending reaction space, means for introducing molten ferrous material in subdivided form into the top of said reaction space, means for introducing oxidising gas into the top of said reaction space and means for collecting the subdivided molten ferrous material at the bottom of said reaction space, said reaction space being closed at the top whereby the oxidising gas is constrained to flow downwardly through the reaction space.

2. Apparatus according to claim 1 wherein said means for introducing oxidising gas into the top of said reaction space comprises at least one pair of tuyeres mounted in the wall of said tower near to the top thereof, the tuyeres of each said pair being located diametrically opposite one another.

References Cited in the file of this patent
UNITED STATES PATENTS

| | | |
|---|---|---|
| 92,667 | Stewart | July 13, 1869 |
| 137,025 | Rand | Mar. 18, 1873 |
| 558,947 | Hawkins | Apr. 28, 1896 |
| 2,819,160 | Bannister et al. | Jan. 7, 1958 |